United States Patent [19]

Grigsby

[11] Patent Number: 5,090,843

[45] Date of Patent: Feb. 25, 1992

[54] CHEMICAL SEAL FOR WASTE DISPOSAL COVER SYSTEMS

[76] Inventor: Charles O. Grigsby, 4269 Ridgeway Dr., Los Alamos, N. Mex. 87544

[21] Appl. No.: 656,762

[22] Filed: Feb. 15, 1991

[51] Int. Cl.$^5$ .............................................. E02D 3/12
[52] U.S. Cl. ................................. 405/129; 405/263; 405/264
[58] Field of Search .............. 405/128, 129, 263, 264, 405/270, 271; 106/900

[56] References Cited

U.S. PATENT DOCUMENTS

| | | | |
|---|---|---|---|
| 4,375,930 | 3/1983 | Valiga | 405/128 |
| 4,869,621 | 9/1989 | McLaren et al. | 405/263 |
| 4,908,129 | 3/1990 | Finsterwalder et al. | 405/129 X |
| 4,981,394 | 1/1991 | McLaren et al. | 405/129 |
| 5,008,020 | 4/1991 | Surash et al. | 405/129 X |

*Primary Examiner*—David H. Corbin
*Attorney, Agent, or Firm*—Ray G. Wilson

[57] ABSTRACT

A low-permeability zone analogous to natural low permeability zones is deliberately formed within a landfill, mine tailings or other cover system to prevent the migration of water or other substances into or out of the wastes being isolated. Natural low-permeability zones such as caliche, calcrete, silicrete or gypcrete are formed by natural processes including leaching, transport, and re-precipitation of slightly soluble minerals through the action of rain or other water percolating through the soil column. The deliberate formation and stabilization of a low-permeability zone is accomplished by the (1) intentional addition of appropriate minerals or other materials to affect the supply of chemical components or to change the soil physical properties such as permeability or porosity, (2) judicious application of water or other solutions to increase the rate of transport, dissolution or precipitation, (3) compaction of these minerals, and (4) design of the overlying layers to provide the optimum stabilization of the seal. Appropriate minerals for the man-made low-permeability zone or chemical seal include those minerals that form natural low-permeability zones in soils.

11 Claims, 3 Drawing Sheets

CHEMICAL SEAL FOR WASTE DISPOSAL COVER SYSTEMS

BACKGROUND OF THE INVENTION

This invention relates to solid waste management, and, more particularly, to sealing disposal sites for landfills, mine tailings piles, and the like.

Material placed on top of solid waste to isolate the waste from the environment is the cover. Covers are primarily used in closing landfills, in stabilizing mine tailings piles, and in isolating other solid, hazardous or radioactive wastes from the environment. They serve to (1) reduce or eliminate infiltration of water which could transport contaminants from the solid waste material into the groundwater system, (2) prevent the release of volatile components or gases that may be present or generated within the solid waste material, and (3) reduce or eliminate dispersal of the solid wastes by natural processes such as wind or erosion, or by activities of animals, plants or humans. A typical cover system design includes one or more of the following components: (1) a compacted clay layer which acts as a low-permeability barrier to prevent infiltration of water or to prevent the release of gases from the solid wastes, (2) a flexible membrane liner or "geotextile" designed to prevent water infiltration into the compacted clay layer, (3) a drainage layer connected to a drainage system which collects and removes infiltrating surface water, (4) a biointrusion soil layer including gravel or cobbles to prevent intrusion of burrowing animals and of plant roots, (5) a vegetative layer consisting of top soil for promoting the growth of plants which help control erosion and which remove water from the soil cover by transpiration, and (6) an erosion control layer consisting of rock and plants.

Landfill designs currently require one or more liner systems below the solid waste to collect liquid leachates from the waste pile and to prevent contamination of groundwater. On the other hand, the costs associated with moving large volumes of mine wastes often prohibit installation of a liner or barrier below these wastes, so mine tailings piles are most often stabilized in place by the addition of a cover.

Regulation of landfill designs has largely focused on the performance of the liner and leachate collection systems which are installed below the wastes. EPA design guidelines for hazardous waste landfill covers specify that the cover be no more permeable than the liner system. Thus, standard landfill designs rely on the liner/leachate collection system below the wastes to prevent release of contaminants to the environment, and the cover serves to reduce rather than to prevent the infiltration of water into the wastes. Mine tailings pile covers are, in general, much less regulated than covers for solid waste landfills. The primary exception to this general rule is the case of uranium mine tailings piles which release radon from the radioactive decay of uranium daughter products in the mine wastes. In this application, the cover also serves to prevent the release of radon gas to the atmosphere.

The design lifetime of conventional covers depends upon the material being isolated and on the applicable state and federal laws. Typically, post-closure monitoring and maintenance for municipal and hazardous solid waste landfills is required for a minimum of 30 years (40 CFR 265.117(a)(1)). Covers for uranium mill tailings are required to control the release of radioactive materials to the environment for 1000 years (40 CFR 192 for inactive sites and 10 CFR 40 Appendix A for active sites). EPA is considering promulgating regulations governing the isolation of non-uranium mine tailings.

Failure of a cover system leads to water infiltration into the solid waste and eventual leakage of the leachate into the environment. Catastrophic failure can occur by any of several methods including: erosion of the cover; internal subsidence of the solid wastes accompanied by rupture of the compacted clay layer; intrusion by plant roots, animals or humans; physical, chemical or biological degradation of the polymer liner; geological activity such as faulting or landsliding; or freezing and thawing cycles. Even without a major failure of the landfill cover, long-term water seepage through the compacted clay layer has been observed in municipal landfills, indicating that compacted clay acts more as a barrier than as a seal. Significant improvements in cover system designs would reduce or eliminate water permeation through the cover by forming a geologically stable seal within the cover that would avert failure of the cover by these mechanisms and/or would be sealed in situ by natural processes.

Accordingly, it is an object of the present invention to form a sealing layer or chemical seal within a cover system by emplacing and compacting a material that will recrystallize to a form that ultimately has a much lower permeability than can be achieved solely by compaction of a cover component material such as soil or clay.

Another object of the present invention is to incorporate a material into the cover layers that can be transported by natural water percolation to the seal zone where it can be incorporated into and be effective to reinforce and stabilize the seal.

An additional object of the present invention is to incorporate a material into the cover design that can repair defects or prevent the deterioration of the cover seal integrity.

One other object of the present invention is to form a seal within a cover system that is enhanced or strengthened by natural processes.

Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the apparatus of this invention may be characterized as a chemical cover system seal for a landfill, mine tailings or other solid, hazardous or radioactive waste. A sealing layer is formed from a slightly soluble mineral effective to form durable low permeability layers of soil horizons such as caliche, calcrete, silicrete, gypcrete, or the like. Minerals that are effective to form these low permeability horizons are selected from the group consisting of calcium carbonate, magnesium carbonate, calcium sulfate, and silica.

In another characterization of the present invention a sealing layer within a landfill, mine tailings or other solid, hazardous or radioactive waste cover is formed by natural processes of mineral dissolution and aqueous transport through top layers of the cover system, and precipitation of the minerals from the aqueous solution at a preselected depth. These transport processes are controlled by processes effective to increase the rate of formation of the sealing layer. Suitable processes include disposing minerals in the upper zones of a cover system effective to form horizons of caliche, calcrete, silicrete, gypcrete, and the like, to provide additional material to be transported and irrigating the cover at the appropriate intervals to provide water at intervals effective for transporting minerals to a preselected depth in the cover system. Plants for the cover are selected to remove water from within the cover by transpiration. Mineral precipitation and seal formation at a consistent depth within the cover system will reduce the soil permeability at that location and reduce or prevent the downward motion of water.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DESCRIPTION OF THE INVENTION

Figure 1:
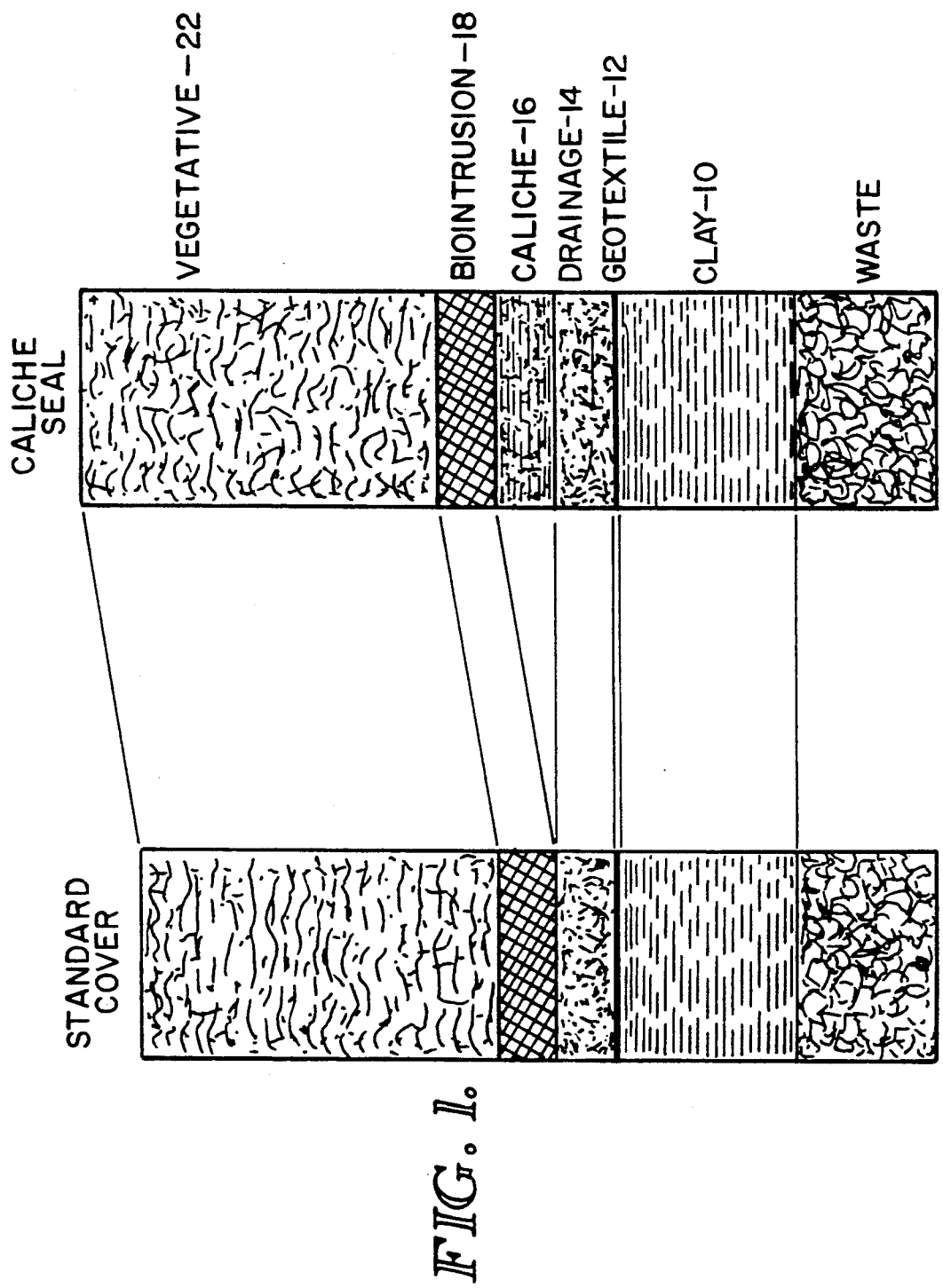
FIG. 1 is a pictorial illustration, in cross-section, of one embodiment of the present invention including a chemical seal in comparison to a standard cover system.

In accordance with the present invention as shown in FIG. 1, a low-permeability zone 16 of caliche, calcrete, silicrete, or gypcrete is deliberately formed within a cover system. A standard cover design is shown in parallel with the present system. Referring to FIG. 1, the first component of the cover to be applied over the compacted wastes is a one- to two-foot-thick compacted soil or clay layer 10 which acts to minimize water infiltration into the compacted waste or gas transport out of the waste. Although this compacted layer has a low permeability, it does not recrystallize in such a way as to cement the clay or soil particles together. Water infiltration into this layer causes the clay to swell and, upon drying, cracks can form that lessen the integrity of this layer. An impermeable plastic liner (flexible membrane liner or geotextile) 12 may optionally be placed on top of the clay layer to prevent infiltration of water into the compacted clay layer. Layer 14 is a high-permeability drainage layer of approximately one-half to one foot thickness that conducts infiltrating water from the upper layers of the cover system to a sump or drainage system for removal. In accordance with the present invention, but not in standard cover designs now in use, a seal 16 of low-permeability material is formed and stabilized above the high-permeability drainage layer 14. An optional biointrusion barrier 18 of gravel and cobbles acts to prevent or reduce animal or plant root intrusion into the low permeability layers. A two- to three-foot-thick layer 22 of topsoil supports plant growth which reduces wind and water erosion of the cover and helps remove infiltrating water by transpiration. A rock mulch or riprap layer 23 may be added to reduce erosion from the cover surface, if desired. Layers 18, 22, and 23 form a top layer having a predetermined depth above seal 16.

Figure 3:
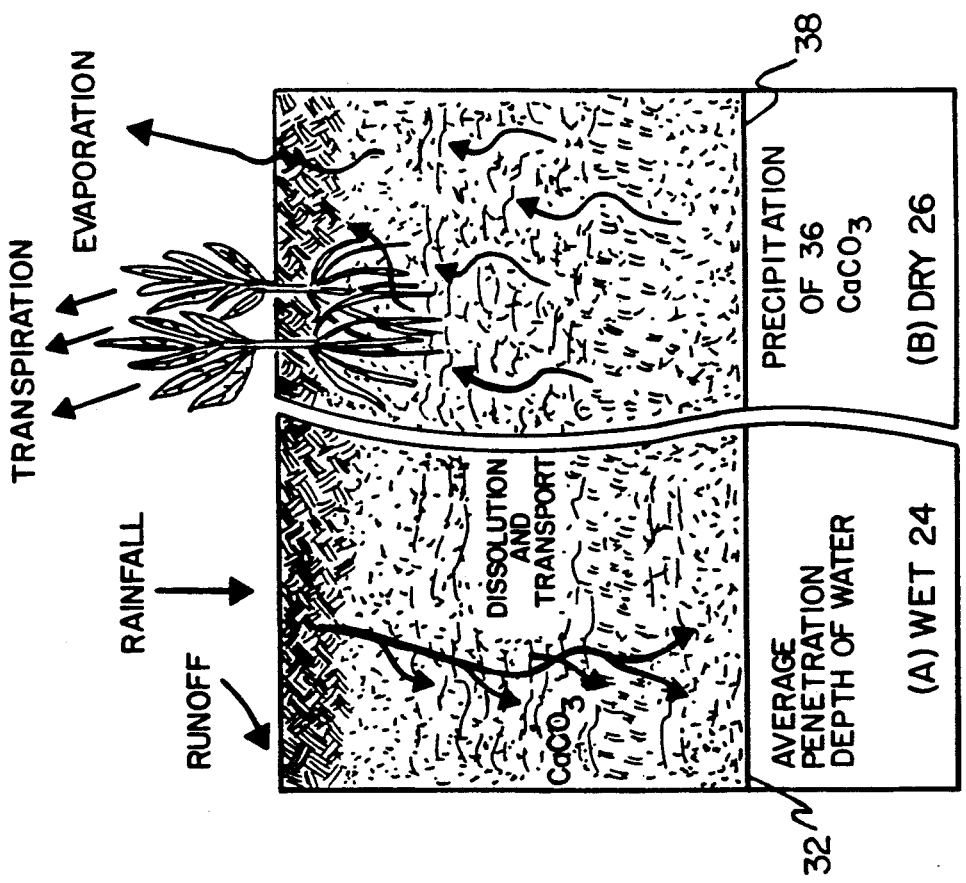
FIG. 3 is a pictorial illustration, in cross-section, of the (A) wet and (B) dry transport processes that are promoted to form, enhance, stabilize or reinforce the seal shown in FIG. 1.

The processes which are responsible for forming natural, low-permeability horizons in soils are enhanced in the present process to form and stabilize a seal within a cover system. These processes include leaching, transport, and re-precipitation of slightly soluble minerals through the action of rain or scheduled irrigation to produce water percolating through the soil column as shown in FIG. 3. There are two parts to this figure: "wet" cycle 24 and "dry" cycle 26. During the wet cycle 24, rainfall or irrigation causes water to percolate into the soil column. Minerals dissolved by the infiltrating water are transported downward 28 as the excess water drains from the soil. Excess water is the amount of soil water that is in excess of the field capacity of the soil. At some penetration depth 32, the amount of excess water diminishes to the point that drainage stops. During dry cycle 26, evaporation and transpiration 34 remove the water from the soil. As water is removed, dissolved minerals precipitate 36 in the soil pores. Repeated alternation of the wet 24 and dry 26 cycles causes a net downward transport of slightly soluble minerals until at some depth 38 the mineral precipitation completely fills the soil porosity. The precipitation depth 38 of this low-permeability zone within the soil column depends upon the soil permeability, porosity and field capacity, the amount of rainfall received in a wet event, and the degree to which the soil can dry between successive wet events.

Appropriate minerals that are effective to form a seal according to the present invention include naturally occurring or man-made forms of calcium or magnesium carbonate (such as calcite, dolomite, limestone, dolomitic limestone, and/or caliche bearing soils), calcium sulfates (gypsum, anhydrite), silica (quartz, amorphous silica, silica sand, fumed silica, glass microspheres, etc.). It will be understood that certain combinations of chemicals (for example, calcium hydroxide and calcium bicarbonate) react to form these solids and are equivalent to placing the solid in a position to form the seal. These materials may be in the solid state, in suspension, or dissolved in a solution that is subsequently applied to the cover material.

The major factors that control the rate of formation of a low-permeability horizon within a soil under natural conditions fall into four general categories: (1) the rate of arrival of source materials (minerals and water) to the site; (2) the rate of transport of the dissolved minerals through the soil column due to mineral solubility, intrinsic mineral dissolution rates, and infiltration or percolation rates; (3) extent and duration of soil drying between subsequent wet episodes; and (4) chemical conditions such as soil pH or chemical environment that inhibit the recrystallization of the minerals. Within a known climatic range, the rate, thickness and depth of seal formation can be deliberately controlled by application of the present invention.

The major transport factors can be controlled by: (1) placing a 0.5 to 1.0 foot thick layer of crushed mineral (such as calcium carbonate) above the drainage layer in the landfill cover; (2) wetting or drying the mineral layer to a water content effective for compaction to a selected bulk density; (3) thoroughly compacting the mineral layer to reduce its porosity; and (4) applying aqueous solutions of materials that will increase the rate of formation of a seal by dissolving, transporting and reprecipitating mineral material into the pore space in the compacted mineral layer. Compaction reduces the pore volume by squeezing out air and redistributes mineral material to fill the pores or voids in the layer, and causes the mineral grains to be in very close contact which fosters local dissolution, reprecipitation and cementation of the mineral grains. Ultimately, this process forms the seal.

By compacting the sealing material at the selected horizon in the cover system, the transport factors discussed above are enhanced. However, the ultimate stability of the seal is also affected by the vegetative layer that is emplaced above the seal zone during construction of the cover. Occasional drying of this layer is required to halt the downward transport of aqueous solutions and to cause mineral precipitation to occur in or just above the selected seal zone. The depth at which the low-permeability seal zone is formed depends on a number of environmental and climatic factors: amount and distribution of waterfall received by the cover, the mean daily air temperature and humidity, soil factors such as field capacity and porosity, and the type of plant cover. At a given geographical location, naturally occurring conditions will produce a zone of the selected seal material within a known or determinable depth below the surface. A suitable design depth for the cover seal is at or below this natural depth.

The process for forming the chemical seal according to the present invention involves deliberately increasing the rate of formation of a low-permeability zone within a cover system by (1) disposing and compacting a layer of an appropriate mineral at the position of the seal layer 16 (FIG. 1), i.e., the depth of natural layer formation at a given geographical location, and (2) adding water or other solutions to control the rate of transport, dissolution or precipitation within this compacted layer. Appropriate minerals include calcite, limestone, dolomite, and caliche (for caliche or calcrete seal layers); gypsum and anhydrite (for gypcrete seal layers); quartz, amorphous silica, silica sand, and fumed silica (for silicrete seal layers). The details of the process for forming the seal are determined for any given site depending on climatic factors, soil factors, and availability of the appropriate naturally-occurring materials for seal formation. The following discussion illustrates the process of installing a seal within a cover system.

There are four stages for installation of the chemical seal: cover design, pilot testing of the design, cover installation, and post-installation activities. Design of a cover system that incorporates the chemical seal involves specifying the composition, thickness and method of installation for each layer in the cover. Design issues that affect the emplacement and long-term stability of the chemical seal are: (1) the amount or thickness of each material placed or disposed in the sealing layer, (2) the initial degree of compaction of this material, and (3) the thickness of the vegetative and other layers placed above the seal horizon. Because of the variability in materials and climate, the cover design should be field tested on a small scale (100 square feet) using the actual materials, thicknesses and installation procedures specified by the design.

The amount of material disposed as a separate layer within the cover to form a stable sealing horizon will depend upon the required performance of the sealing layer. Thicker layers should be applied where the need for ensuring long-term stability of the seal is more important than other factors such as cost. In general, a mineral layer having a compacted thickness of one-half to one foot should be sufficient for arid to semi-arid climates. The important consideration in determining the thickness of the compacted mineral layer is that sufficient material be present in this layer so that the volume reduction which occurs on recrystallization of the minerals placed in this layer will not jeopardize the mechanical strength of the resulting dense chemical seal. Other factors which influence the design thickness of this layer include the particle size distribution of the source material, the compactability as given by standard tests, and the potential for use of aqueous solutions of materials that might directly seal the porosity of the compacted layer.

Figure 2:
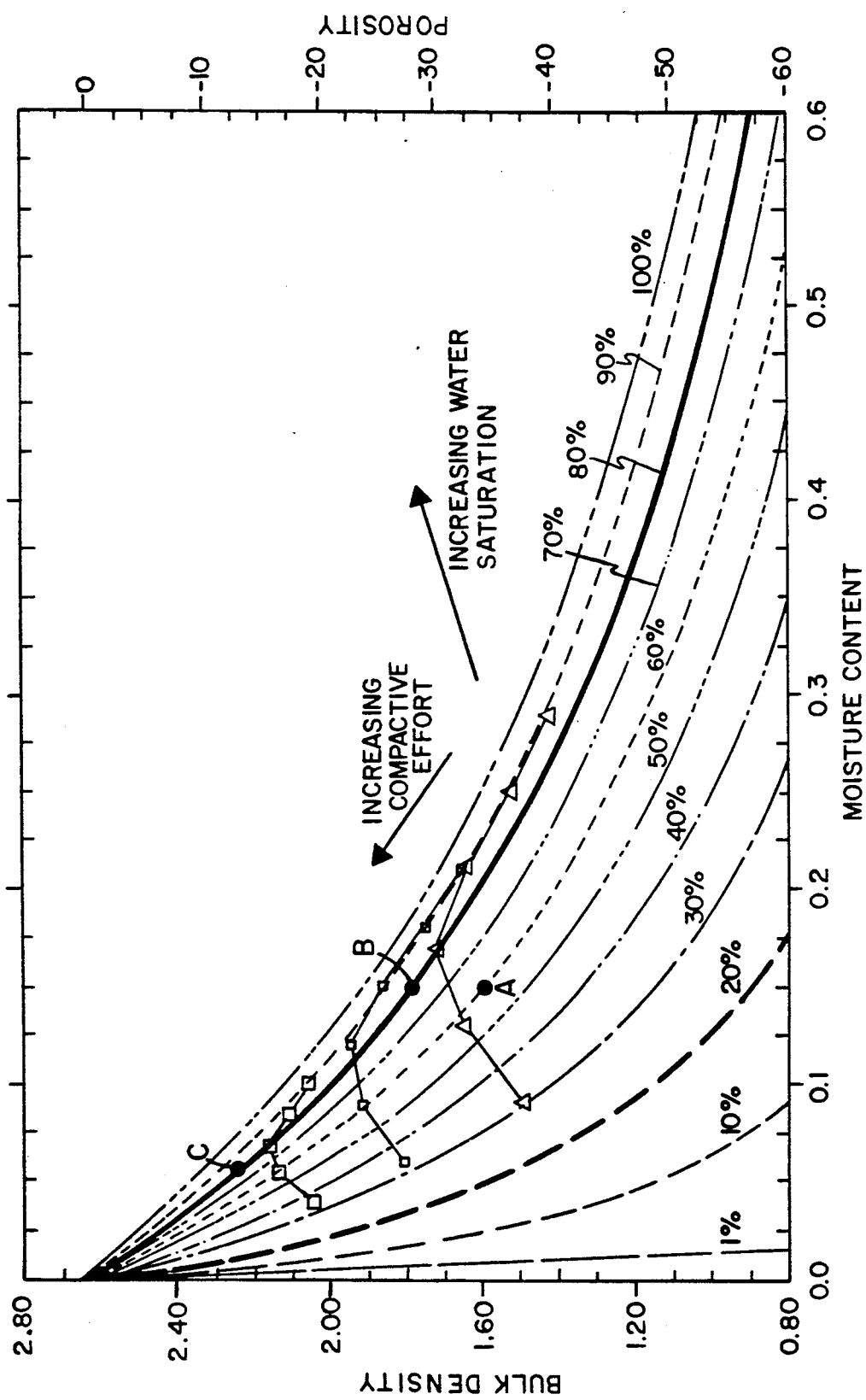
FIG. 2 graphically depicts the relationships among material density, porosity, water saturation and water content of a solid material, and shows the effects of these parameters on the amount of compaction that can be obtained by using various amounts of compactive effort.

Compaction acts to redistribute the mineral grains so that they are in closer contact and so that the porosity of the material is reduced. Dissolution and reprecipitation of the mineral grains, or transport of additional material into this zone, eventually fills the pore spaces, thus forming the chemical seal. For purposes of the present invention, a relatively high degree of compaction is desired, but the actual compaction is not critical and compactive effort can be traded for rate of seal formation, as determined by field tests discussed below. The principles of compaction are well-known and set out in numerous reference texts (e.g. Hillel, *Fundamentals of Soil Physics*, Chapter 14: "Soil Compaction and Consolidation", 1980, which is incorporated herein by reference). Graphical relationships between the moisture content, bulk density, porosity, and degree of water saturation of the porosity can be conventionally constructed using these principles. By way of example, FIG. 2 illustrates these relationships for a material having an intrinsic density of 2.65 g/cm$^3$. As shown in FIG. 2, the bulk density of the material is plotted on the vertical axis as a function of moisture content (horizontal axis) for various degrees of water saturation of the porosity. A water saturation of 80%, for example, means that 80% of the void volume of the material is filled with water and the remaining 20% is filled with air. The vertical axis on the right gives the porosity corresponding to the bulk density through the relationship:

Bulk Density = Intrinsic Density $\times$ (1—Porosity).

Also shown on FIG. 2 are curves of constant compactive effort (moisture-density curves) given by the triangles, small squares and large squares. Compactive effort refers to the amount of energy applied in compacting a given volume of material. The compactive effort curves show that there is a maximum bulk density that can be obtained for a given level of compactive effort. The moisture content corresponding to the maximum bulk density is called the optimum moisture content. The line connecting the maximum bulk densities for different levels of compactive effort has been empirically observed to follow the 80% water saturation line which is shown as a heavy solid line in FIG. 2.

Consider a poorly compacted material having a bulk density of 1.6 g/cm$^3$ and a moisture content of 15% (point A on FIG. 2). If the moisture content is not changed, the maximum obtainable bulk density will be given by the intersection (point B on FIG. 2) of the 15% moisture content line (vertical) with the 80% water saturation line which is the locus of the maxima of the moisture-density curves. The bulk density at this point is 1.78 g/cm$^3$. To achieve higher compactions, the material must be dried before being compacted. For example, to obtain a compacted density that is 85% of the intrinsic density (85% of 2.65 g/cm$^3$ = 2.25 g/cm$^3$), the maximum moisture content should be about 5 to 6% (point C on FIG. 2).

Because of the wide variations in particle size, shape, and overall composition of crushed natural materials, there is no priori method for determining the shape of the moisture density curve for a given material. However, standard laboratory tests such as the Proctor Test (ASTM D698 or AASHO T99) or the Modified Proctor Test (ASTM D1557 or AASHO T180) have been developed for estimating a material's compaction characteristics using small samples.

Since the details of the installation process are site specific, optimizing the effectiveness of the installation requires both laboratory and field scale tests using the actual materials of construction. Laboratory tests would include: (1) determining the field capacity of the mineral material and of the material used in the vegetative layer, (2) determining the volume reduction achieved by compaction of the seal material, (3) determining the permeability and porosity of the uncompacted and compacted seal materials, and (4) microscopic examination of the compacted materials to look for evidence of cementation of the mineral grains and for plugging of porosity. Pilot tests involve creating a small scale cover, about 100 square feet as discussed above, to test the installation processes using the actual materials and equipment to be used in final installation. Testing of the seal formed in this plot involve (1) performing infiltration tests on the compacted seal layer, (2) taking core samples for microscopic examination, and (3) taking core samples for determination of the permeability and porosity of the compacted seal material.

Several methods can be used for determining the design thickness of the vegetative layer to place the chemical seal layer at a natural formation depth. Numerical (computer) models used for predicting the soil water balance in agricultural systems can be used to calculate the percolation depth of aqueous solutions and the efficiency of transpiration in removing soil moisture for a given set of climatic and soil conditions. Two examples of such models are CREAMS (Chemicals, Runoff and Erosion in Agricultural Management Systems, W. G. Knisel, editor, USDA Conservation Research Report No. 26, 1980) or GLEAMS (Groundwater Loading Effects of Agricultural Management Systems, R. A. Leonard, et al., Trans. ASAE 30(5): pp 1403–1418, 1987).

These water balance models can be coupled with chemical equilibrium models to predict the depth of formation of stable sealing layers within the cover system. Examples of useful chemical equilibrium codes are SOLMINEQ (Solution-Mineral Equilibrium, available from Y. Kharaka, U.S. Geological Survey, Menlo Park, Calif.) or EQ3-NR (available from T. Wolery, Lawrence Livermore National Laboratory, Livermore, Calif.). Other numerical models developed for specific mineral systems include CALSOIL (D. L. Weide, ed., *Soils and Quaternary Geology of the Southwestern U.S.*, "Rate and Depth of Pedogenic Carbonate Accumulation in Soils: Formulation and Testing of a Compartment Model", GSA Special Paper #203, Boulder, Colo., 1985), and CALDEP (G. M. Marion, et al., "CALDEP: A Regional Model for Soil CaCO$_3$ (Caliche) Deposition in Southwestern Deserts", Soil Science 139: 468–481, 1985). The effects of adding additional sealing mineral within the vegetative layer, irrigating or watering the soil, and of changes in water chemistry (e.g.. acid rain) can also be predicted using numerical models. Thus, the design of an optimum process for forming a seal at a given geographical location can be readily obtained.

To ensure the long-term stability of the chemical seal with respect to leaching and other natural processes that might have the potential to breach the sealing layer, additional seal material can be incorporated within the vegetative layer. This material is dissolved and transported into the seal layer by rainfall or by irrigation water. Changes in water chemistry, for example modification of the water acidity by air pollution (acid rain), may affect the long-term stability of the chemical seal. The additional material placed above the chemical seal layer can be selected to neutralize the effect of such changes in water chemistry before these changes could threaten the stability of the seal itself. The additional material would also be effective in repairing minor defects in the chemical seal as the material would be transported into the breach by any infiltrating water.

Figure 4:
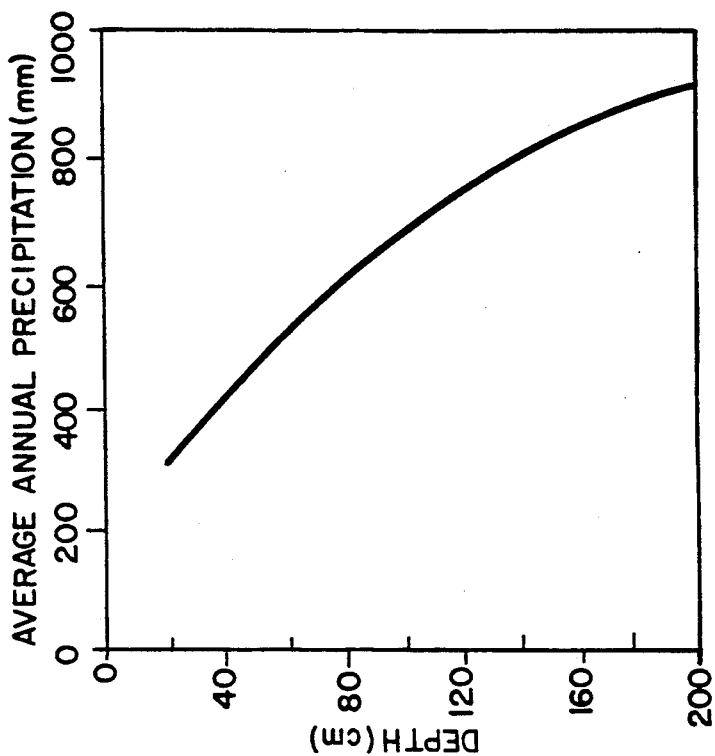
FIG. 4 is an exemplary graph showing the observed depth of formation of natural calcium carbonate or caliche layers as a function of average annual precipitation for loessal (windblown sand) soils along the 11° C. isotherm in the central United States (from Jenny and Leonard, 1934).

In addition to being designed by numerical computer calculations, landfill covers may also be designed empirically based on observations made during site characterization studies. For example, in areas where caliche is observed, the total cover thickness should be greater than the depth at which caliche naturally occurs. In the absence of direct information about depth of a caliche horizon, a first approximation can be made from the graph shown in FIG. 4 which relates the depth of the caliche horizon to the local annual rainfall for loessal (fine, wind-deposited) soils. Seal horizons formed from other minerals are also expected to form at about the same depth as caliche, at least to a first approximation, because the depth of the caliche layer marks the average depth at which water drainage stops during typical wet events.

Emplacing a compacted mineral layer in a cover system is accomplished as follows. A layer of sand-sized (<2 mm) or finer particles of a selected mineral is spread over an area to be sealed. Larger particles (up to ¼ inch in diameter) might also be used provided that sufficient fine material is present to significantly reduce the porosity on compaction. The moisture content of the material is adjusted to a selected moisture content (as determined from laboratory compaction experiments) for the desired level of compaction (specified by the engineering design) by sprinkling to increase the moisture content or by discing to reduce moisture content. This layer is then compacted to the specified final bulk density using standard compaction techniques and equipment. The compacted density of the layer is measured using standard techniques and equipment to ensure that the appropriate level of compaction is achieved. Additional layers (or lifts) of loose material are then applied and compacted until the desired total thickness of seal layer 16 is achieved.

Seal formation can be accelerated with the addition of very fine powdered material or aqueous solutions of materials that are compatible with the sealing material either before compaction or after compaction. Such materials might include, for example, powdered lime (CaO), calcium hydroxide ($Ca(OH)_2$), silica ($SiO_2$) or other such material and solutions of sodium bicarbonate ($NaHCO_3$) or sodium silicate ($Na_2O.xSiO_2$, where $x=3$ to 5). These materials and solutions react in such a manner as to form a precipitate within the porosity of the sealing layer.

Emplacement of an appropriate thickness of soil to act as a vegetative layer above the sealing layer follows standard earth-moving techniques. The thickness of the vegetative layer should equal or slightly exceed the design thickness to allow for compaction of this layer.

Watering or irrigation of the vegetative layer after emplacement can help accelerate the rate of recrystallization of the material in the sealing layer in areas where the rainfall frequency is low. Increasing the number of wet-dry cycles in this layer will increase the rate of transport and the amount of material transported into the sealing zone while maintaining the depth of the sealing zone. The wet cycle augmented by irrigation is designed to provide only enough soil moisture for water to percolate into the chemical seal zone. Water removal from the cover system during the dry cycle is enhanced by the appropriate choice of cover vegetation and by ensuring that any water collected in cover drainage layers 14 is removed as soon as possible to avoid a saturated portion of the soil column.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A chemical seal for a landfill, mill or mine tailings site, and other solid waste disposal sites, comprising:
   a low-permeability seal layer of a compacted mineral material, selected from the group consisting of calcium carbonate, magnesium carbonate, calcium sulfate, and silica, above the solid waste in said disposal sites; and
   a layer of soil materials above said layer of mineral material, said soil layer having a thickness equivalent to the depth of formation of a natural analogue layer of said mineral material under the climatic conditions found at the locality of the cover being installed.

2. A seal layer according to claim 1, wherein said mineral material is selected from the group consisting of calcite, dolomite, limestone, dolomitic limestone, and caliche.

3. A seal layer according to claim 1, where said mineral material is selected from the group consisting of gypsum and anhydrite.

4. A seal layer according to claim 1, wherein said mineral material is selected from the group consisting of quartz, amorphous silica, silica sand, fumed silica and glass microspheres.

5. A seal layer according to claim 1, wherein said layer of soil includes additional amounts of said mineral material that can be dissolved, transported downward by percolating water, and precipitated within the seal layer for formation, stabilization and repair of said seal layer.

6. A seal layer according to claim 5, wherein said mineral material is selected from the group consisting of calcite, dolomite, limestone, dolomitic limestone, and caliche.

7. A seal layer according to claim 5, where said mineral material is selected from the group consisting of gypsum and anhydrite.

8. A seal layer according to claim 5, wherein said mineral material is selected from the group consisting of quartz, amorphous silica, silica sand, fumed silica and glass microspheres.

9. A seal layer according to claim 1, further including a material compound, selected from the group consisting of lime, calcium hydroxide, sodium bicarbonate, and sodium silicate, disposed above said seal layer effective to react with an aqueous solution of the same or other material compound to produce solid mineral material that is compatible with said seal layer material and that precipitates within the pores of said seal layer.

10. A method for forming, stabilizing and repairing a seal layer formed from a mineral selected from the group consisting of calcium carbonate, magnesium carbonate, calcium sulfate, and silica, comprising the steps of:
    forming a layer of soil materials above said seal layer to a thickness equivalent to the depth of formation of a natural analogue layer of said mineral material under the climatic conditions found at the locality of said seal layer;
    disposing additional amounts of said mineral in said soil layer above said seal layer; and
    watering said material in an amount additional to natural rainfall effective to transport said mineral to the depth of said seal layer for precipitation from solution.

11. A method for forming, stabilizing and repairing a seal layer from a mineral selected from the group consisting calcium carbonate, magnesium carbonate, calcium sulfate, and silica, comprising the steps of:
    forming a layer of soil materials above said seal layer to a thickness equivalent to the depth of formation of a natural analogue layer of said mineral material under the climatic conditions found at the locality of the said seal layer; and
    disposing in said soil layer above said seal layer a material selected from the group consisting of lime, calcium hydroxide, sodium bicarbonate, and sodium silicate effect to react in aqueous solutions to produce calcium carbonate, calcium sulfate, or silica for transportation to said seal layer.

* * * * *